(12) United States Patent
Camoli

(10) Patent No.: US 6,880,589 B2
(45) Date of Patent: Apr. 19, 2005

(54) CONTAINER FOR COLLECTING AND TRANSPORTING DRAINED OIL

(76) Inventor: Marco Camoli, 2, via dell 'Artigianato, Castel Guelfo (Bologna) (IT)

( * ) Notice: Subject to any disclaimer, the term of this patent is extended or adjusted under 35 U.S.C. 154(b) by 0 days.

(21) Appl. No.: 10/729,224

(22) Filed: Dec. 5, 2003

(65) Prior Publication Data
US 2004/0256023 A1 Dec. 23, 2004

(51) Int. Cl.[7] .................................................. B65B 1/04
(52) U.S. Cl. .......................... 141/98; 141/331; 184/1.5; 184/106; 220/573
(58) Field of Search .......................... 141/98, 331–342; 184/1.5, 106; 220/573

(56) References Cited

U.S. PATENT DOCUMENTS

| 4,557,395 | A | * | 12/1985 | DeLay, Jr. ................. 220/86.1 |
| 4,974,647 | A | * | 12/1990 | Eastom ......................... 141/98 |
| 5,503,246 | A | * | 4/1996 | Raboin et al. ............... 184/1.5 |
| 5,975,156 | A | * | 11/1999 | Senour ......................... 141/98 |

* cited by examiner

Primary Examiner—Steven O. Douglas

(57) ABSTRACT

A plastic container having an internal chamber for collection and transport of drained fluid oil, a handle on an upper part and a cylindrical protrusion on a lower part of the container provided with a mouth closed by a cap, the upper part of the container has a recess for removable elements to be used for fluid or oil changing and for adding of new oil in a manner similar to a funnel which is screwed into a hole, a cap is provided at the end of the oil discharge for closing or opening the hole on which the funnel is placed, and two collecting elements are placeable onto inlet holes or openings for oil which is to be added into the motor, to provide for positioning of the funnel and consequently to provide for the addition of new oil or topping-up oil to the engine.

19 Claims, 3 Drawing Sheets

CONTAINER FOR COLLECTING AND TRANSPORTING DRAINED OIL

BACKGROUND OF THE INVENTION

Field of the Invention

This invention is concerned with the removal and addition of fluid to a motor vehicle.

More particularly, the invention is concerned with the removal of a used fluid, such as motor vehicle oil from the engine of a motor vehicle and the addition of a new fluid, such as engine oil to the motor vehicle without causing stains or other discolorations to the surrounding environment while at the same time enabling the user of a container for this purpose also being dirtied by the fluid.

Accordingly, this invention is concerned with a novel container, together with its parts, to facilitate the removal of unwanted fluid and the addition of new fluid, and to avoid damage, contamination or soiling of the individual performing the operation or the surrounding area where the operation is carried out.

It is a common practice for the collection of oils drained from vehicles to use containers. These apparatuses, at the beginning, were a simple basin obtained from cut plastic containers. Then these containers were modified and turned into containers with suitable forms. In this art, containers are known which have a funnel-shaped top wall and with an internal chamber for accommodating the oil that is drained from the vehicle and again for pouring the oil into the containers for the discharge. Then, it is also necessary to consider that the plastic containers are intended to reduce to a minimum the dirtying both of the workers and the surrounding area where the work is done. The primary purpose of plastic containers known in the art only have the purpose to collect the drained oil and are to be used for transport of the oil collected into the particular containers. Moreover, the plastic containers are only to be used inside the workshop.

While the present invention will be explained and described in connection with removal and addition to the engine of a motor vehicle, it can be easily adapted and modified to include all fluids of a motor vehicle which can soil the workers and surrounding area.

The plastic container, according to the invention, instead is born and is primarily intended both for its use inside a workshop, and for a work made or carried out by specialized workers, than for a motor vehicle owner who changes the lubricating oil him or herself.

Nevertheless, in accordance with one aspect of the present invention, the invention is provided with structural elements which enable it to be transported within the motor vehicle, and for those with small garages, it has the advantage of storage in an easily locatable place or area.

BRIEF SUMMARY OF THE INVENTION

The container, according to the invention, is preferably a plastic container, although other materials may also be quite suitable. With the present invention, a user is able to realize also a second purpose which is not provided by the present day known oil collecting containers. The container according to the invention, in fact, on the basis of its novel structure and shape, also provides for the ability to replace the old or used oil with new oil.

After draining the oil from the engine of a motor vehicle, it is taken away or removed, and to do what is the necessary oil topping-up both inside the workshop rather than elsewhere without the use of other means or tools. For these reasons, the container according to the invention is very useful also during emergency situations where it may not be possible to have other means than the present invention carried on or in a storage area of the vehicle A feature of the present invention is that the container according to the invention has very low production costs to permit a big diffusion of the same. Moreover, on the outer surface of the container, it is possible to provide parts or portions with advertising to be placed thereon so as to reduce the costs of the container further for obtaining the container item and also to permit the purchase of advertising at a symbolic or low price, as well as purchase the advertised goods at a low price.

To these ends, the present invention consists in the provision of a container for collecting and transporting drained oil, comprising a storage and oil access arrangement including an oil storage container and associated funnel arrangement for storage with the container and for connection to the storage container and an engine from which oil is to be drained, the storage container has an internal chamber for the receipt and storage of oil from a protrusion extending from the funnel and having connection means for connection to an inlet orifice coupled to the container, the storage container includes a recess on a top side of the container for receiving the funnel arrangement for storage as a unit with such storage container, the storage container includes at least one and preferably two vent hole extension members connected with the chamber, an exit orifice and a cap therefore, the exit orifice being used for dispensing oil from the chamber, and the vent hole being used for venting the chamber when oil is added to the chamber, and the container including at least one and preferably two collecting elements receivable in a storage opening in the storage container for connection with an oil inlet to the engine, the at least one collecting element including internal threads for mating with the external threads on the protrusion for addition of oil to the engine.

The container includes on one side an area for the receipt of an information holder to provide for a place to record pertinent information concerning the removal of oil from the engine.

The protrusion has a mouth which opens into the container when connected thereto and includes a closure cap provided for closure of the mouth. The protrusion is provided with external threads to mate with internal threads of the closure cap when the closure cap is screwed onto the threaded protrusions, and an O-ring is provided which is fittable between the cap and the protrusion to provide a fluid-tight seal.

The container includes a recess on one side thereof for receipt of advertising material and/or material to provide operating instructions for the container and/or material to record information about when a new oil change should take place. The container also includes "velcro" connection members on a bottom or resting side to provide for a gripping action with velcro gripping material in a storage area of the vehicle.

The recess is provided with internal threads and the protrusion is provided with external threads for mating with and screwing the protrusion into the recess for locking the funnel arrangement and storage container together for storage purposes. The funnel arrangement also includes a funnel portion provided with breakaway grooves to avoid or prevent splashes or discharges of motor oil as a result of a free fall of oil inside said funnel portion. A fin is provided inside a central hole of the funnel arrangement to avoid the casual or unwanted introduction of unwanted material into the chamber together with drained oil.

A vent hole closure cap is provided for each vent hole extension member, the closure cap and said vent hole extension member being provided with mating threads, and an O-ring fittable over said at least one extension member for providing a fluid-tight fit when the vent hole closure cap is screwed onto the vent hole extension member to prevent oil leakage.

Each collecting element includes a peripheral collar to facilitate gripping of the collecting element.

The storage opening in the storage container is a cylindrical blind hole provided on a top side of the storage container.

The funnel and each collecting element are physically connectable with the storage container for storage.

DETAILED DESCRIPTION OF THE INVENTION

Figure 1:
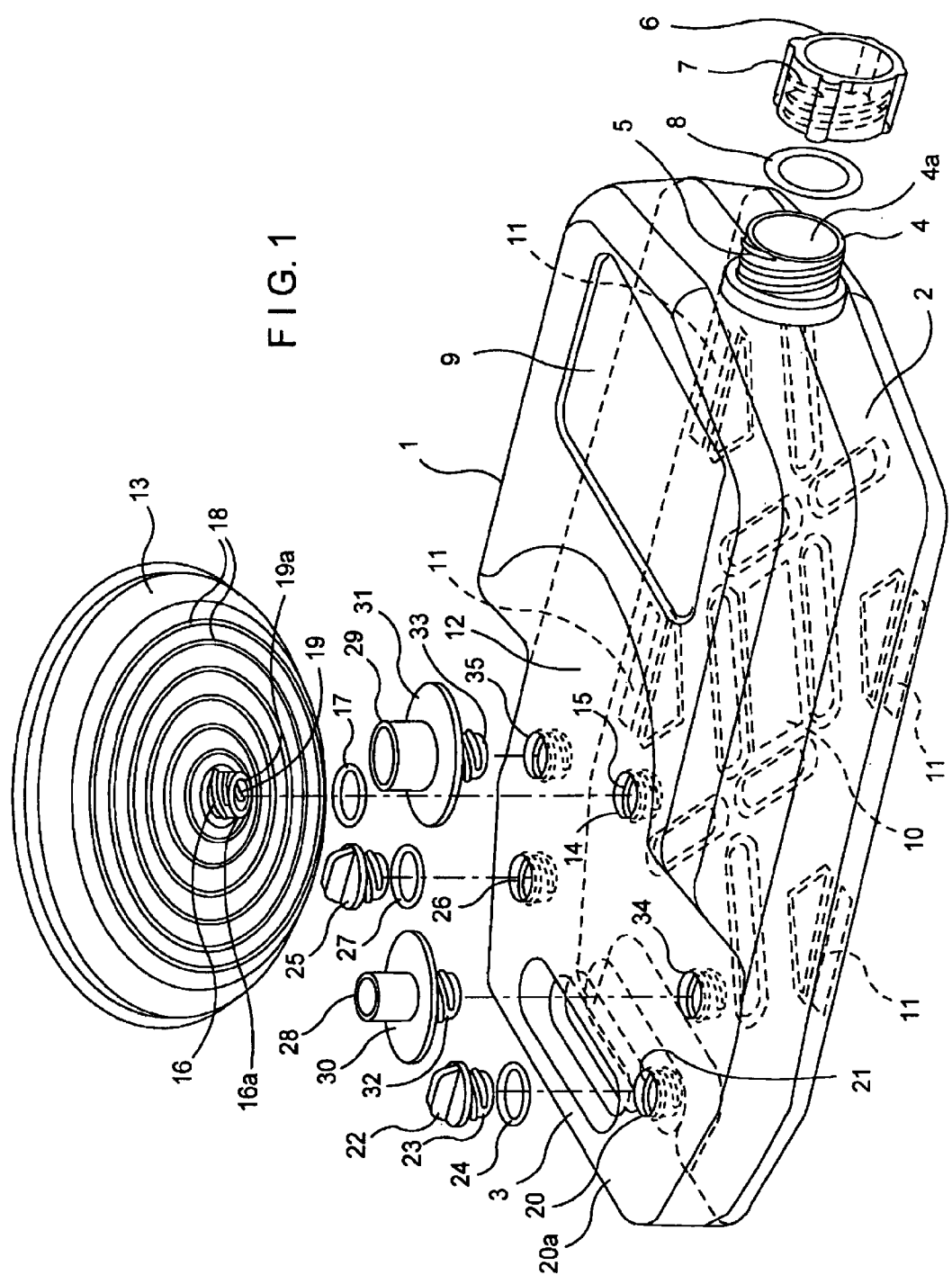
FIG. 1 is an overall view in exploded form of the different elements of the plastic container 1 according to the invention.
Figure 3:
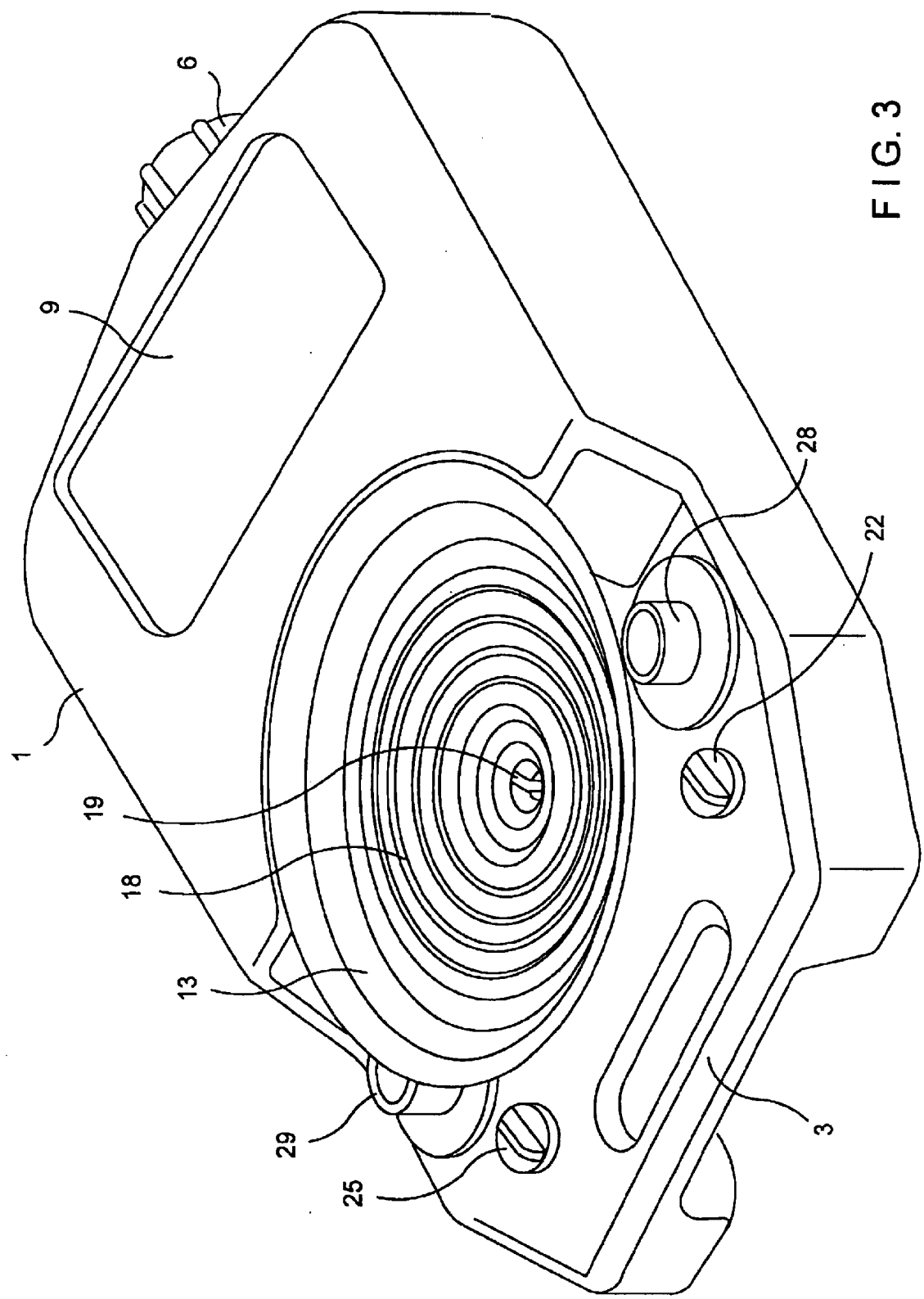
FIG. 3 is perspective view of the top wall of the container with the different elements in position and illustrating the advertising space 9.

Referring now more particularly to the drawings which illustrate the presently preferred mode for carrying out the invention, reference is made in particular to FIG. 1 which shows removable funnel 13 spaced from container 1, and the funnel 13 coupled with container 1 in FIG. 3,'

Figure 2:
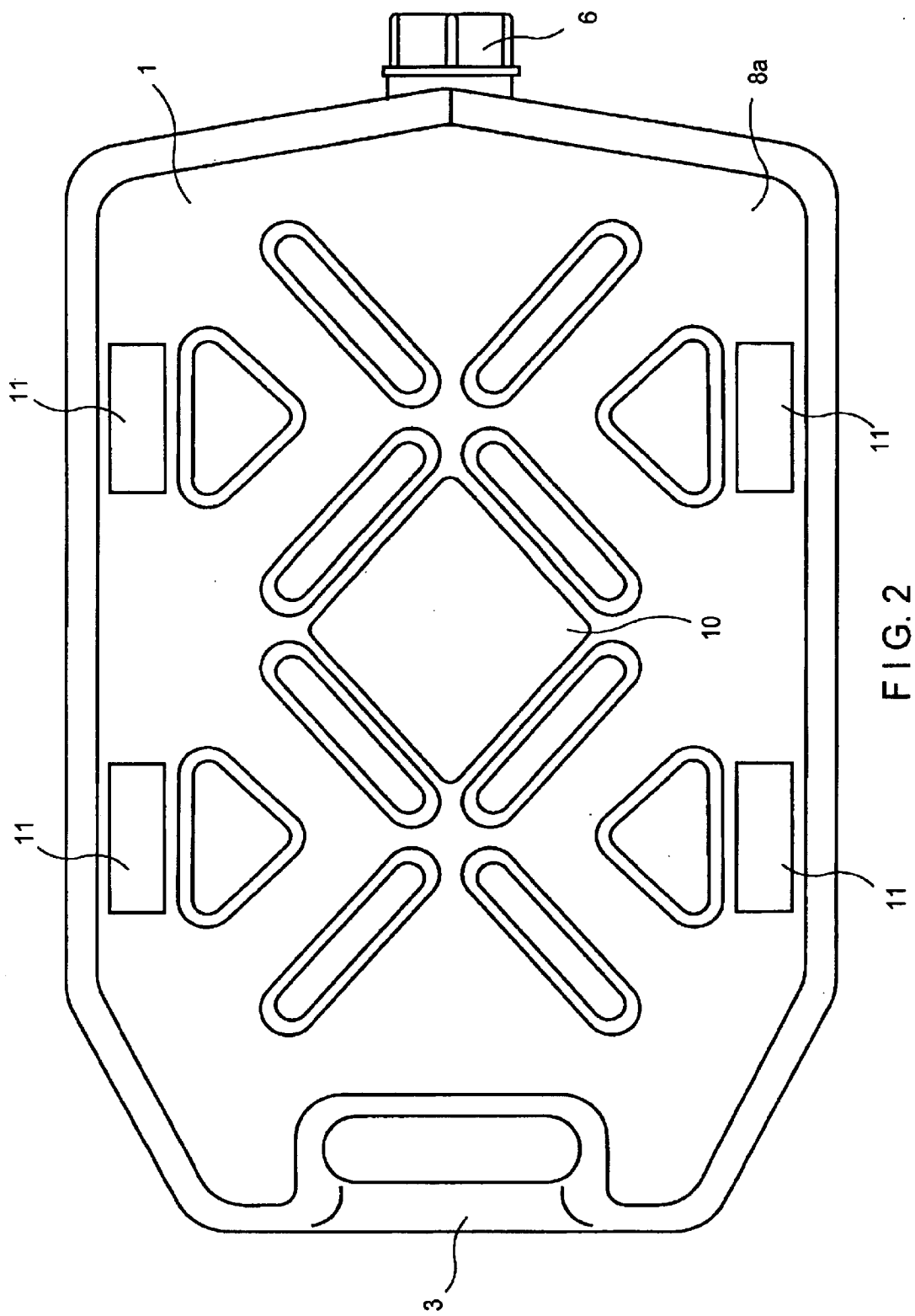
FIG. 2 is view of the lower wall of the container to show space 10 and "velcro" parts 11.

In order to appreciate the advantage of the invention, an ancillary feature to provide for storage of the container in a storage area of the motor vehicle, container 1 is provided with "velcro" connectors 11 at the bottom as best seen in FIG. 2, and provision is also made for a further advertising feature and advertising space 10.

The invention more specifically includes a fluid collection, transportation and fluid dispensing apparatus and generally includes a container, an associated funnel, and inlet and exit orifices. Additional features include an apparatus storage arrangement on the apparatus and areas for the recordal of important and valuable information.

The apparatus, according to the invention includes plastic container 1 provided with an internal chamber 2 which is capable of collecting and transporting the drained oil. The upper part of the container is provided with a handle 3 to enable the container to be easily gripped and carried. On the lower part of the container, a cylindrical protrusion 4 has mouth 4a and is provided with an external thread 5.

The cylindrical protrusion 4 has mouth 4a and is provided with a first closure cap 6 for closure of mouth 4a and the cap 6 is provided with an inside thread 7 in order to prevent oil or any fluid inside the container from exiting. For a better seal and to avoid any possible oil losses through the mating threads 5 and 7, a rubber O-ring 8 is provided and placed and located in position.

The top outside wall of the container 1 is provided with a suitable space or recessed portion 9 to place or receive, by means of stickers or other suitable means in a relief or depression of the recessed portion 9, information, such as an oil advertisement or other suitable advertisement. In this space or recessed portion 9, there is also present or provided a part with a paper to write the vehicle distance in kilometers or miles so as to have the possibility of recording and knowing when an oil change is necessary on the basis of the indicated distance in kilometers or miles or based on a time period when the last oil change was made.

The container is provided with a second advertising space 10, see FIG. 2, on the opposite side, i.e., on the lower side or bottom resting side. On the lower wall or base 8a "velcro" parts 11 are provided to place the container in fixed way or manner inside the boot or trunk or other storage area of the vehicle. The basis for this is that many of the vehicles today have boots, trunks, or storage areas covered with carpet, and consequently it is sufficient to press the container against the carpet to have a steady and firm gripping of the container 1 on the carpet for firm storage of the container. In this way, in fact, the rough part, or gripping portion, of the "velcro" comes into contact with the carpet to adhere the container to the carpet so as to avoid shaking and jerks of the container inside the vehicle during movement of the vehicle. If the storage area does not have a carpet, one can be easily obtained for placement in the storage area.

On a top side, or the upper part, the container has a recess 12 into which the removable elements to be used for the oil changing and for adding new oil inside the motor are to be placed or temporarily stored. For this purpose, a removable funnel 13 is provided to be screwed into a threaded opening or a hole 14 provided on the container for permitting the flow of the drained oil to the inside of the chamber 2. The funnel 13 is shown juxtaposed on the container in FIG. 3, and separated from container 1 in FIG. 1.

The hole 14 is provided with an internal cylindrical part having an internal thread 15. The internal thread 15 corresponds to and mates with an outside thread 16 on the cylindrical protrusion 16a of the funnel 13, as best seen in FIG. 1. For a better seal an O-ring 17 is provided to provide for a fluid-tight seal.

The funnel 13 is provided with breakwater grooves 18. The grooves 18 have the aim and purpose to avoid or prevent splashes or discharges of motor oil or fluid as a result of a free falling or a flow of oil or fluid inside the funnel 13. Moreover, the grooves 18 have the characteristic to avoid an oil or fluid spill such as they have angulations capable of breaking the oil flow and to concentrate the oil toward a central hole 19a of the funnel 13.

Inside central hole 19a, there is provided a fin 19 to avoid the casual or unwanted introduction of rounds, caps or other undesirable materials from inside the chamber 2 of the container together with the drained oil.

During the use phase, when the motor oil or other fluid is to be changed, container 1 is located, with the funnel 13 screwed on it, and placed under the crankcase of the motor vehicle with the cap 6 closed and a vent hole 20 provided on the top side 20a of the container is opened. The vent hole 20, is used as a gas vent and has an inside thread 21, and it is closed by means of a cap 22 provided with outside threads 23 and is also provided with the interposition of an O-ring 24.

After the oil has been drained from the engine and discharged into the inside of the container, the cap 22 is screwed again onto the vent hole 20, and the funnel 13 is taken away with manual unscrewing from the hole 14 and internal or inside thread 15. The hole 14 is then provided with a second closure cap 25 having an external thread to be screwed inside the internally threaded blind hole 26 also together with the interposition of an O-ring 27. Cap 25, at the end or completion of the oil discharge, is used to close the hole 14 on which the funnel 13 was placed through which the oil exits.

Then after closing all of the openings with caps 22 and 25, the drained oil is transported to an oil disposal collection center in a normal or conventional time and manner. In order to extract the oil from the inside of the container and pour it into appropriate collection containers, the lower cap 6 is removed and the container 1 is emptied.

The plastic container according to the invention, in a manner differently from the heretofore known containers with a funnel-shaped top wall, has top removable elements. Therefore, this permits, differently from what is known in the art, to use the removable funnel 13 for the oil to enter into the engine or for the topping-up of the engine.

To facilitate the operation and use of container 1, two collecting elements 28 and 29 are provided to be used for all the oil inlet holes inside the engine. The collecting elements 28 and 29 are provided with outwardly extending collars 30 and 31, to make easy and facilitate the gripping or holding of the elements, and threads 32 and 33 on the outer surface of collecting elements 28 and 29 made with the internal threads inside cylindrical part corresponding to the thread 15 of the cylindrical protrusion of the funnel 13.

During the non-use phase, the collecting elements 28 and 29 are fitted or stored inside the cylindrical blind holes 34 and 35 provided on the plastic container 1.

To make the inlet of the oil inside the motor, or to actuate the topping-up, funnel 13 is screwed in one of the collecting elements 28 or 29 on the base of the side of the inlet hole of the motor of the motor vehicle.

To complete and end this operation, the funnel and the collecting elements are screwed and they are placed again onto the container with conventional joinder or screwing.

While there has been shown what is considered to be a preferred embodiment of the invention, it will be obvious to those skilled in the art that various changes and modifications may be made without departing from the scope of the invention.

What is claimed is:

1. A container for collecting and transporting drained oil, comprising:
    a storage and oil access arrangement including an oil storage container and associated funnel arrangement for storage with said container and for connection to said storage container and an engine from which oil is to be drained;
    said storage container having an internal chamber for the receipt and storage of oil from a protrusion extending from said funnel and having connection means for connection to an inlet orifice coupled to said container;
    said storage container including a recess on a top side of said container for receiving said funnel arrangement for storage as a unit with such storage container;
    said storage container including at least one vent hole extension member connected with said chamber, an exit orifice and a cap therefore, said exit orifice being used for dispensing oil from said chamber, and said vent hole being used for venting said chamber when oil is added to said chamber; and
    said container including at least one collecting element receivable in a storage opening in said storage container for connection with an oil inlet to the engine, said at least one collecting element including internal threads for mating with said external threads on said protrusion for addition of oil to the engine.

2. The container as claimed in claim 1 wherein said container includes on one side an area for the receipt of an information holder to provide for a place to record pertinent information concerning the removal of oil from the engine.

3. The container as claimed in claim 1 wherein said protrusion has a mouth which opens into said container when connected thereto and includes a closure cap provided for closure of said mouth.

4. The container as claimed in claim 3 wherein said protrusion is provided with external threads to mate with internal threads of said closure cap when said closure cap is screwed onto said threaded protrusions, and an O-ring fittable between said cap and said protrusion to provide a fluid-tight seal.

5. The container as claimed in claim 1 wherein said container includes a recess on one side of said container for the receipt of advertising material and/or material to provide operating instructions for the container and/or material to record information about when a new oil change should take place.

6. The container as claimed in claim 1 wherein said container includes "velcro" connection members on a bottom or resting side to provide for a gripping action with velcro gripping material in a storage area of the vehicle.

7. The container as claimed in claim 1 wherein said recess is provided with internal threads and said protrusion is provided with external threads for mating with and screwing said protrusion into said recess for locking said funnel arrangement and storage container together for storage purposes.

8. The container as claimed in claim 1 wherein said funnel arrangement includes a funnel portion provided with breakaway grooves to avoid or prevent splashes or discharges of motor oil as a result of a free fall of oil inside said funnel portion.

9. The container as claimed in claim 8, including a fin inside a central hole of said funnel arrangement to avoid the casual or unwanted introduction of unwanted material into said chamber together with drained oil.

10. The container as claimed in claim 1 including a vent hole closure cap for said at least one vent hole extension member, said closure cap and said vent hole extension member being provided with mating threads, and an O-ring fittable over said at least one extension member for providing a fluid-tight fit when said vent hole closure cap is screwed onto said vent hole extension member to prevent oil leakage.

11. The container as claimed in claim 1 wherein said at least one collecting element includes a peripheral collar to facilitate gripping of said at least one collecting element.

12. The container as claimed in claim 11 wherein said storage opening in said storage container is a cylindrical blind hole provided on a top side of said storage container.

13. The container as claimed in claim 1 wherein said associated funnel and said at least one collecting element are physically connectable with said storage container for storage.

14. A container for collecting and transporting drained oil from a vehicle including:
    a plastic cylindrical container (1) having an internal chamber (2) for collection and transporting the drained oil;
    an upper part of said cylindrical container including a handle (3) and a lower part of said cylindrical container being provided with a protrusion (4) having a mouth (4a) and a cap (6) for closure of said mouth;

said container on an upper part thereof having a recess (12) for receiving removable elements for use in connection with oil draining to change engine oil and for adding new oil to the engine of the vehicle;

a funnel (13) capable of being screwed into a hole (14) on said cylindrical container;

a cap (25) for closure of the hole (14) upon completion of the oil discharge; and two phase collecting elements (28 and 29) for placement onto engine inlet holes for adding oil into the engine to permit positioning of said funnel (13) and providing for inlet of new oil or for a topping-up of oil to the engine.

15. The container for collecting and transporting drained oil from a vehicle as claimed in claim 14, including O-rings for prevention of oil leakage.

16. The container for collecting and transporting drained oil from a vehicle, as claimed in 14, including "velcro" parts (11) positioned on a lower part of the container to cooperate with elements in a storage area of the vehicle to maintain the container in a fixed position inside the storage area of the vehicle.

17. The container for collecting and transporting drained oil from a vehicle, as claimed in 14, wherein said hole (14) is provided with an internal thread (15) corresponding to an outside thread (16) on a cylindrical protrusion of said funnel (13).

18. The container for collecting and transporting drained oil from a vehicle, as claimed in 14, wherein:

said container is provided with a vent hole (20) and a first cap (22) therefore; and including:

a funnel provided with a screw connector for screwing the funnel onto an opening into a crankcase for pouring of oil into the crankcase of the vehicle for proceeding with a procedure for changing the oil under the crankcase of the motor vehicle with the cap (6) closed and the vent hole (20) open; and after the oil has been drained from the engine, said cap (22) is screwed onto said vent hole (20), and said funnel (13) is taken away and said hole (14) is closed with a cap (25) and the elements removed are placed in position onto the container.

19. The container for collecting and transporting drained oil from a vehicle, as claimed in 14, including cylindrical blind holes (34 and 35) for fitting said two phase collecting elements (28 and 29) inside said cylindrical blind holes (34 and 35), said cylindrical blind holes (34 and 35) being provided on said plastic container (1).

* * * * *